(12) United States Patent
Tao

(10) Patent No.: US 8,681,520 B2
(45) Date of Patent: Mar. 25, 2014

(54) KIND OF LLC RESONANT CONVERTER FOR FULL VOLTAGE RANGE AND ITS CONTROL METHOD

(76) Inventor: Shunzhu Tao, Tangshan (CN)

( * ) Notice: Subject to any disclaimer, the term of this patent is extended or adjusted under 35 U.S.C. 154(b) by 364 days.

(21) Appl. No.: 12/935,574

(22) PCT Filed: Jul. 9, 2010

(86) PCT No.: PCT/CN2010/075082
§ 371 (c)(1),
(2), (4) Date: Apr. 5, 2011

(87) PCT Pub. No.: WO2011/069366
PCT Pub. Date: Jun. 16, 2011

(65) Prior Publication Data
US 2011/0310640 A1 Dec. 22, 2011

(30) Foreign Application Priority Data
Jun. 18, 2010 (CN) .......................... 2010 1 0202666

(51) Int. Cl.
*H02M 7/53862* (2007.01)

(52) U.S. Cl.
USPC ......................................... 363/97; 363/21.02

(58) Field of Classification Search
USPC ......... 363/21.02, 21.03, 97, 98; 323/282, 284
See application file for complete search history.

(56) References Cited

U.S. PATENT DOCUMENTS

| | | | | |
|---|---|---|---|---|
| 5,909,362 A | * | 6/1999 | Adams | 363/21.03 |
| 7,564,704 B2 | * | 7/2009 | Rozsypal et al. | 363/56.1 |
| 7,688,600 B2 | | 3/2010 | Sauerlander | |
| 7,848,117 B2 | * | 12/2010 | Reinberger et al. | 363/16 |
| 8,422,250 B2 | | 4/2013 | Halberstadt | |
| 2010/0020569 A1 | * | 1/2010 | Melanson et al. | 363/21.03 |
| 2010/0073976 A1 | * | 3/2010 | Kimura et al. | 363/95 |

FOREIGN PATENT DOCUMENTS

CN 200610061463.4 2/2007
CN 201010134302.x 8/2010

* cited by examiner

Primary Examiner — Gary L Laxton

(57) ABSTRACT

This invention relates to a LLC resonant converter for full input voltage range and its control method. The full voltage range LLC resonant converter comprises a LLC resonant converter circuit, a current type main loop current sampler, a rectifier, a main loop energy quantifier, an energy comparator, a return-to-zero pulse generator, an oscillator, and a split phase controller. The LLC resonant converter is configured to turn on electronic switches with ZVS state in full input voltage range. This invention realizes the full voltage working range of LLC resonant converter, guarantees its reliability, and enables designing a LLC converter to be a solid state converter. The LLC resonant converter can be widely used in applications such as non-contact charging stations for electric vehicle, electromagnetic inductance heating and switch power.

7 Claims, 4 Drawing Sheets

KIND OF LLC RESONANT CONVERTER FOR FULL VOLTAGE RANGE AND ITS CONTROL METHOD

This invention relates to a LLC resonant converter for full input voltage range and its control method, and belongs to LLC resonant power conversion field.

BACKGROUND TECHNOLOGY

LLC resonant power conversion technology can be widely used in non-contact electric vehicle charging stations, electromagnetic induction heating, switching power supply and non-contact energy transmission. As an existing solution method, phase-locked loop control technology has been used in LLC resonant converter now to solve its reliability problems. LLC resonant converter has some virtues such as high efficiency, low electromagnetic interference, and simple control in circuitry; and as shown by FIG. 1, a resonant current signal is sampled by a current transformer and is sent to a phase-locked loop circuit, and is compared with a phase-locked loop output signal at phase to generate a phase error voltage; after filtering, the LLC resonant converter controls an oscillator synchronized with the current signal, and accomplishes synchronization between a main resonant loop current and the control signal, and so the S1 and S2 electrical switches can be controlled on and off separately by a split-phase controller. However, the key problems of this technology are that an error voltage generated by the phase locked loop should go through a filtering network so it takes 5-10 cycles to prevent the LLC resonant converter to fall into a hard-switching state; and the converter cannot realize a real-time response to changes and dynamics of the LLC resonant converter bus voltage or random load changes, so the reliability issues have not been completely resolved.

In 2004, the U.S. International Rectifier company produced an IR2159 serial LLC resonant converter controlling chips in energy-saving lamps field, but they couldn't fundamentally solve the key reliability problem of the LLC resonant converter yet. The reason is that the phase-locked loop control mode was still adopted in the IR2159 serial chips; the lowest frequency limit of an oscillator has been adjusted and controlled by an integrating circuit, so as a result, not every turning-on pulse signal to the LLC resonant converter can be controlled instantly, and the reliability is low; it is still hard to make a large scale production by using this series of chips.

Here is the technical proposal of the published patent in P.R.C (the application number is 200680010615.6): a converter can shut down the turning-on pulse to ensure a zero-current and zero-voltage switching-on in the next half cycle if a LLC resonant main loop current is above a predefined current maxim, or a main loop current holding time is longer than a time predefined by a control system, or the main loop current has passed zero (a resonant capacitor will pick up a voltage signal). But there is a problem in this kind of controlling method: zero-current and zero-voltage switching on and off conditions of S1 and S2 would be lost if the current has passed zero, because the remained resonant energy of a LLC main resonant tank is not enough to keep the same phase current flowing to the next half turning-on signal cycle in which the corresponding power electronics device is in a reverse conduction, so there is no natural zero-current-switching (ZVS) or zero-voltage switching (ZCS) states. In addition, the control theory is imperfect because a main loop dispersion parameter and load uncertainties would result in incomplete control based on a timing device and in shutting down the turning-on signal pulse by detecting the main current zero-crossing.

Invention Content

The present invention is to provide a full voltage range LLC resonant converter and its controlling method, and to achieve a LLC resonant converter running in a full input voltage range; under the condition that a line in AC voltage only passes through a rectifier without energy storing in a capacitor and freewheeling in an inductor at an output port of a rectifier, a rectified voltage with a full-wave rectified sine waveform will be a power supply for a bus of the LLC resonant converter directly; at any time when a bus voltage of the LLC resonant converter changes from 5% of its maximal voltage (Vmax) to Vmax, a main loop energy quantifier can instantly detect remaining resonant energy of the LLC main loop, and electric device S1 or S2 of the LLC resonant converter will be turned off if the LLC main tank energy decreases to the required energy scale that can ensure corresponding electric switch to work in ZVS on state, and so the remaining resonant energy can make the corresponding electronic switch turned on in ZCS. Without energy storing in a capacitor and freewheeling in an inductor, the probability of a failure in an electrolytic capacitor is inexistence, and the reliability of the LLC resonant converter can get a fundamental guarantee. So in the AC input working situation it becomes true to design a LLC resonant converter to be a solid state converter, and the lifetime of the LLC resonant converter would be equivalent to the lifetime of semi permanent devices used in the LLC resonant converter, then the aforementioned problems in background technology can be resolved fundamentally.

SUMMARY

A full voltage range LLC resonant converter comprising a LLC resonant converter circuit, a current type main loop current sampler, a rectifier, a main loop energy quantifier, an energy comparator, a return-to-zero pulse generator, an oscillator and a split phase controller. The current type main loop current sampler, the rectifier, the main loop energy quantifier, the energy comparator, the return-to-zero pulse generator, the oscillator and the split phase controller are connected in series. A bus voltage of the LLC resonant converter circuit can either be a DC voltage or a full-wave rectified sine waveform voltage gained only from a line in AC rectifier without energy storing in a capacitor or freewheeling in an inductor at its output. The current type main loop current sampler is configured to collect a main loop current signal of the LLC resonant converter circuit, and to send the main loop current signal to the main loop energy quantifier through the rectifier. When the bus voltage range changes from 5% Vmax to Vmax, the main loop energy quantifier can count remaining resonant energy corresponding to measuring a transient voltage of the bus, and output a stable energy waveform Vo. When a value of the remaining resonant energy falls below a predetermined value, the energy comparator is configured to output a control signal to the return-to-zero pulse generator. The return-to-zero pulse generator is configured to reset the oscillator by outputting a return-to-zero pulse to the oscillator. The split phase controller controls the turning-off of electronic switch device S1 or S2, and the remaining resonant energy can make the corresponding electronic switch gain a ZVS on state in the next half working cycle of the LLC resonant converter.

The LLC resonant converter circuit comprises electric switches S1 and S2, and elements such as a resonant inductor (Lr), a resonant capacitor (Cr) at an output of a half-bridge or full-bridge, and a primary winding of a transformer or an electromagnetic induction coil (Tr) in serial connection.

The resonant converter circuit of the LLC resonant converter can comprise a full-bridge, or a half-bridge or a push-pull structure.

The LLC resonant converter is configured to transmit energy via a transformer through magnetic coupling or via a resonant capacitor through picking up electric field energy and coupling to output.

The technical staffs in the same field are familiar with the contents such as a current type main loop current sampler, a rectifier, a main loop energy quantifier, an energy comparator, a return-to-zero pulse generator, an oscillator and a split phase controller.

The current type main loop current sampler comprises current type current signal sampling devices such as a Hall element or a current transformer. The rectifier comprises a full-wave rectifier. The main loop energy quantifier comprises an amplitude limiting conversion circuit. The return-to-zero pulse generator comprises a differential circuit.

The main loop energy quantifier can measure a main loop current waveform, and the energy comparator can perform a comparison; the energy comparator will output a control signal to the return-to-zero pulse generator when the remaining resonant energy of LLC resonant main loop is falling below a predetermined value of energy. To be specific, the LLC resonant main loop energy quantifier measures its input current, and when the remaining resonant energy $Q1$ ($Q1=\Delta t \times lo/2$) of LLC resonant converter circuit is lower than a given energy value $Q2$ (shown in FIG. 2, where the needed energy $Q2$ of S1 or S2 electronic switch ZVS commutation can be defined as $Q2=Cp \times Vin$), the energy comparator will output a control signal to the return-to-zero pulse generator.

The output signal of the current type main loop current sampler passes through a rectifier connected with the current sampler output port, and the signal from the rectifier is a high frequency semi sine wave (when the bus voltage is a DC voltage). When the line in voltage is AC and there is no energy storage in a capacitor or freewheeling in an inductor, the signal from the rectifier is a high frequency semi-sine wave current signal under modulation of line frequency. When the bus voltage ichanges from 5% Vmax to Vmax, the main loop energy quantifier measures the transient bus voltage that is corresponding to the remained LLC resonant main loop energy in real-time, and the main loop energy quantifier will output a stable energy waveform Vo into the energy comparator to make a comparison. The full voltage range control method of LLC resonant converter has the following steps: the bus voltage of LLC resonant converter can be a DC voltage or a full-wave rectified sine wave voltage which is gained from a rectifier connected to the lined in AC voltage, and there are no energy storage in a capacitor or freewheeling in an inductor at the rectifier output port. The current type main loop current sampler samples the current signals from the LLC resonant converter circuit, and its result passes through a rectifier into the main loop energy quantifier; then when the bus voltage changes from 5% Vmax to Vmax, the main loop energy quantifier counts the remained main loop energy of the LLC resonant converter from measuring the transient bus voltage; the main loop energy quantifier can output a stable energy waveform Vo. When the remained resonant energy falls below a predetermined value, the energy comparator outputs a control signal to turn off corresponding electric switch S1 or S2 of the LLC resonant converter. The remaining resonant energy of the LLC resonant main loop can make the corresponding electronic switch ZVS turn on in the next half working cycle of LLC resonant converter.

The output control signal can control to generate a return-to-zero pulse, and the return-to-zero pulse cuts off the oscillator, and the split phase controller turns off the corresponding electric switches of the LLC resonant converter.

It's easy to understand, for the technical staffs in the same field, the working states of the invented LLC resonant converter when it has an input of a DC bus voltage, so it's omitted here.

In the invention, Without energy storage in an electrolytic capacitor and freewheeling in an inductor as mentioned in the background technology, the input AC voltage only pass through a rectifier to serve as the bus voltage of the LLC resonant converter directly. The LLC resonant converter can turn on the electronic switching devices S1 and S2 with ZVS state, when the bus voltage of the LLC resonant converter changes from 5% Vmax to 100% Vmax of the full-wave rectified sine voltage range. As such, the invention can achieve the power transfer functions as PFC, DC/DC and DC/AC.

The energy storage in an electrolytic capacitor and the freewheeling in an inductor connected to a primary winding of a transformer are not used in the invention, so the LLC resonant converter can ensure its high efficiency, and the reliability can be improved greatly (because probability of a failure in a energy storage in a capacitor is high in the prior art under high temperature conditions), and the cost can be reduced. So it's possible to design a LLC resonant converter to be a static converter with a line in AC power supply, and the lifetime of the whole LLC resonant converter can be equal to the semi permanent devices. The LLC resonant converter can be widely used in applications such as non-contact charging station for electric vehicle, electromagnetic induction heating, switching mode power supply and non-contact energy transfer system.

Wherein:frequency alternating cycles—To; the time at which the maxim value of rectified line-frequency through a full wave rectifier is gained—t1, the time at which the minimum value of rectified line-frequency through a full wave rectifier is gained—t2; period of turning on pulse—Ts; output waveform of the main loop energy quantifier—Vo; the reference value to energy comparator—Vf; the time period from the time at which electronic switches S1 and S2 are being turned off to the time that the remained LLC main loop energy is zero—Δt

DETAILED DESCRIPTION

Figure 1:
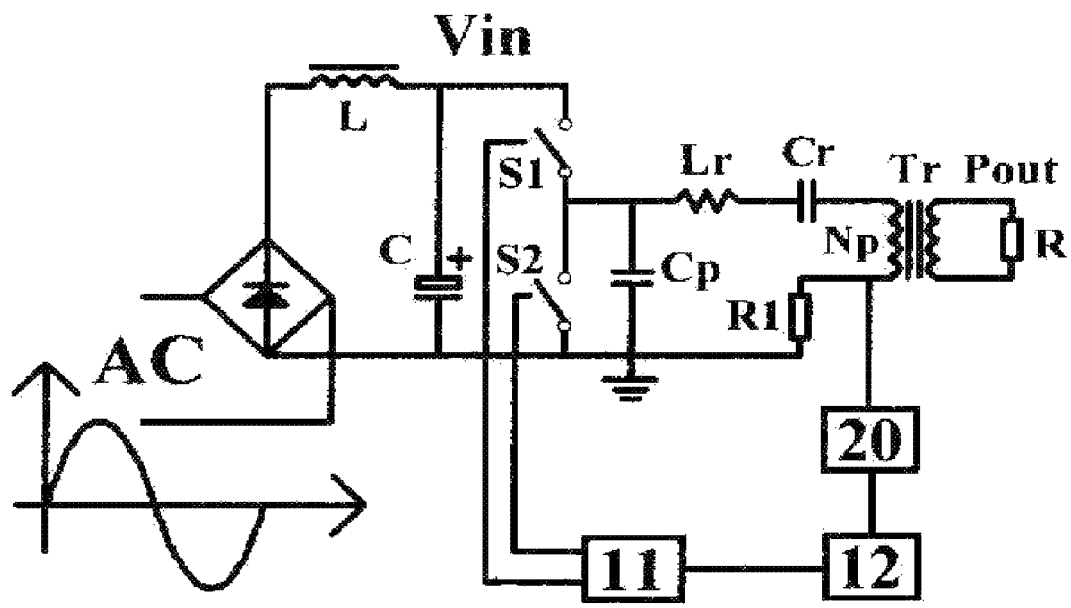
FIG. 1 shows a circuit of the background technical; wherein: phase locked loop —20, oscillator —12, split phase controller —11.
Figure 2:
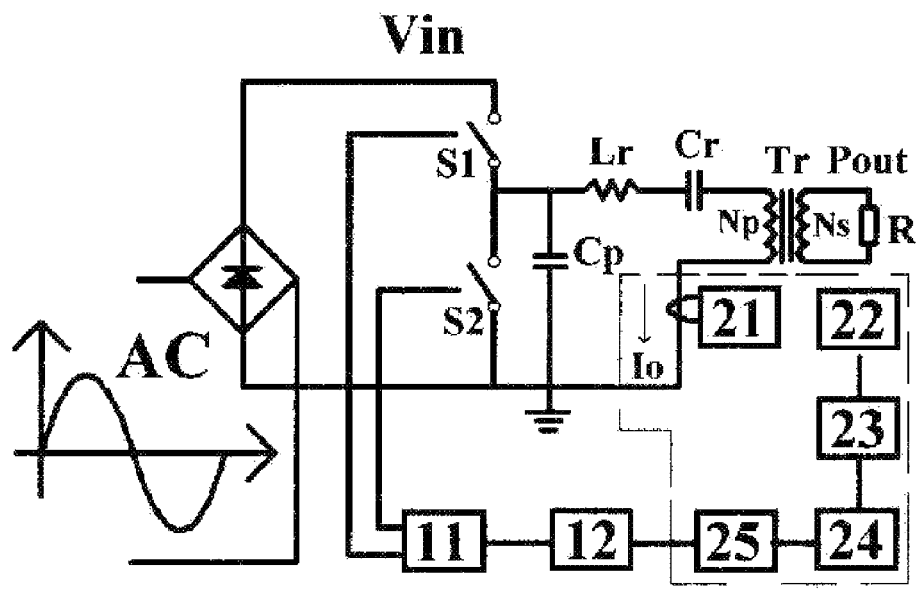
FIG. 2 shows a circuit diagram of the invention according to an embodiment; wherein, LLC resonant converter circuit —1, current type main loop current sampler —21, rectifier —22, main loop energy quantifier —23, energy comparator —24, return-to-zero pulse generator —25, oscillator —12, split phase controller —11, electronic switches S1 and S2, resonant inductor Lr, resonant capacitor Cr, transformer Tr, high frequency current lo of LLC resonant converter main loop, equivalent capacitance Cp of electronic switches.

Referring to the figures of this invention, here is a further description of the embodiments. As shown by one embodiment in FIG. 2, a full voltage range LLC resonant converter comprises a LLC resonant converter circuit (1), a current type main loop current sampler (21), a rectifier (22), a main loop energy quantifier (23), an energy comparator (24), a return-to-zero pulse generator (25), an oscillator (12), a split phase controller (11); wherein the current type main loop current sampler, the rectifier, the main loop energy quantifier, the energy comparator, the return-to-zero pulse generator, the oscillator, and the split phase controller are connected in series. The bus supply voltage of the LLC resonant converter can either be a DC voltage or a rectified line-in AC voltage that has a full-wave rectified sine wave shape without energy storage in a capacitor or freewheeling in an inductor. The current type main loop current sampler is configured to collect a main loop current signal of a main loop of the LLC resonant converter, and to send the main loop current signal to the main loop energy quantifier through the rectifier. When a bus voltage changes from 5% Vmax to Vmax, the main loop energy quantifier is configured to measure the transient voltage to obtain remaining resonant energy of the main loop, and is configured to output a stable energy waveform Vo. If the Q1 value of the remaining resonant energy is lower than a predetermined energy value Q2, the energy comparator is configured to output a control signal to the return-to-zero pulse generator, and the return-to-zero pulse generator is configured to output a return-to-zero pulse to the oscillator to reset the oscillator back to zero. And then the split phase controller is configured to turn off the corresponding electric switches of the LLC resonant converter circuit. The remaining resonant energy can ensure the corresponding electric switch to work at ZVS state in the next half working cycle of the LLC resonant converter. The LLC resonant converter circuit comprises electrical switch S1 and S2 connected in series with a half-bridge output port, a resonant inductor (Lr), a resonant capacitor (Cr), a primary winding of a transformer Tr. The main loop energy quantifier is configured to measure the main loop current waveform, and the energy comparator is configured to make a comparison. When the remaining resonant energy value of the LLC resonant converter circuit is lower than the predetermined value, the energy comparator is configured to output a control signal into the return-to-zero pulse generator. The current type main loop current sampler adopts current sampling device that may comprise a Hall device or a current transformer. The rectifier comprises a full wave rectification circuit. The main loop energy quantifier comprises an amplitude-limiting conversion circuit, and the return-to-zero pulse generator comprises a differentiating circuit.

The current type main loop current sampler is configured to output signals and pass them through the rectifier connected with a current sampler output port, and the signal from the rectifier is a high frequency semi sine wave or a high frequency semi-sine wave modulated in a line frequency. When the bus voltage changes from 5% Vmax to Vmax, the main loop energy quantifier measures the transient bus voltage that is corresponding to the remaining resonant energy in real-time, and is configured to output a stable energy waveform Vo into the energy comparator for a comparison.

A full voltage range control method of a LLC resonant converter has the following steps: measuring a current in a main loop of a the LLC resonant converter circuit; quantifying a remaining resonance energy of the main loop from the current by passing the current through a rectifier to a main loop energy quantifier; comparing the remaining resonance energy with a predetermined energy value; when the remaining resonance energy is lower than the predetermined energy value, actuating one or more switches of an LLC resonant converter circuit. The bus voltage of the LLC resonant converter can be a DC voltage or a full-wave rectified sine wave voltage which is gained from a rectifier connected to a line in AC voltage, and there are no energy storage in a capacitor or freewheeling in an inductor at a rectifier output port. The current type main loop current sampler collects current signals from the LLC resonant converter circuit, and passes the current signals through a rectifier into a main loop energy quantifier; then when the bus voltage changes from 5% Vmax to Vmax, the main loop energy quantifier counts remaining resonant energy of the LLC resonant converter from measuring a transient bus voltage; the main loop energy quantifier outputs a stable energy waveform Vo. When the remaining resonant energy is below a predetermined energy value, an energy comparator outputs a control signal to turn off corresponding electric switch S1 or S2 of the LLC resonant converter. The remaining resonant energy of the LLC resonant main loop turns on corresponding electronic switch by ZVS in the next half working cycle of the LLC resonant converter.

Figure 3:
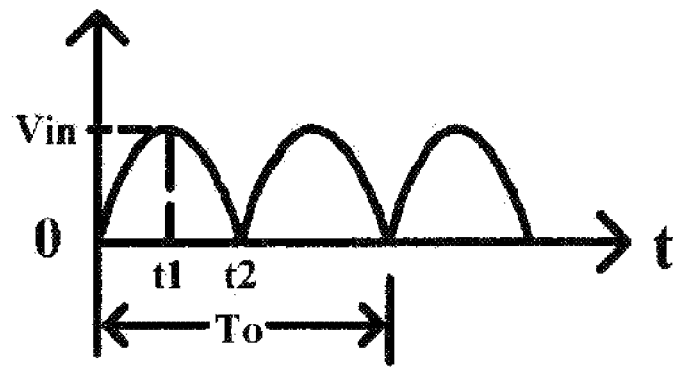
FIG. 3 shows a waveform of a bus voltage according to an embodiment.
Figure 4:
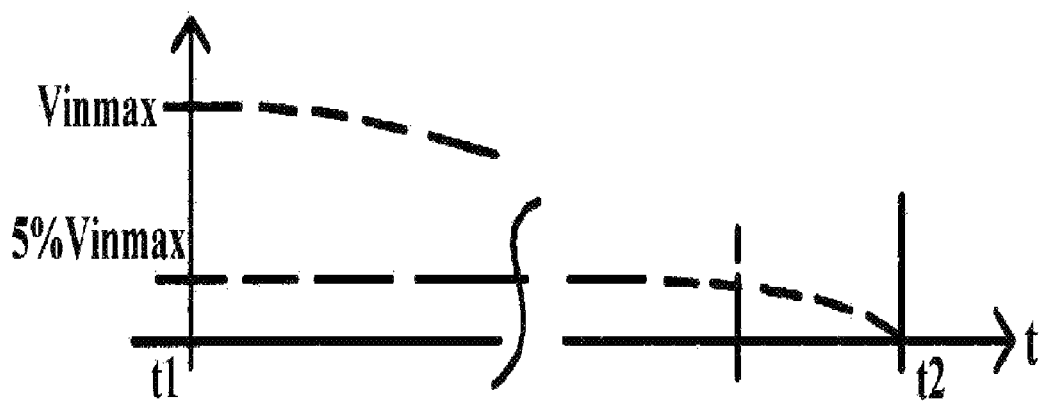
FIG. 4 shows waveforms of the minimum and maximum amplitude value of the bus voltage according to an embodiment.
Figure 5:
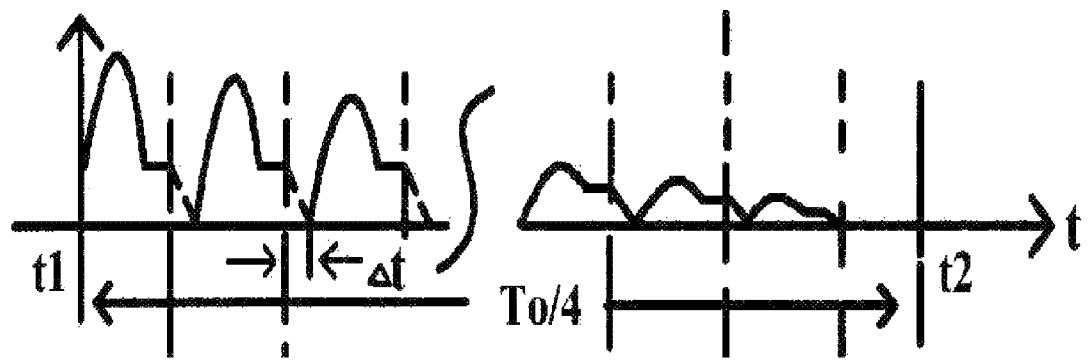
FIG. 5 shows a waveform of a high frequency current outputted from a rectifier according to the embodiment of FIG. 4.
Figure 6:
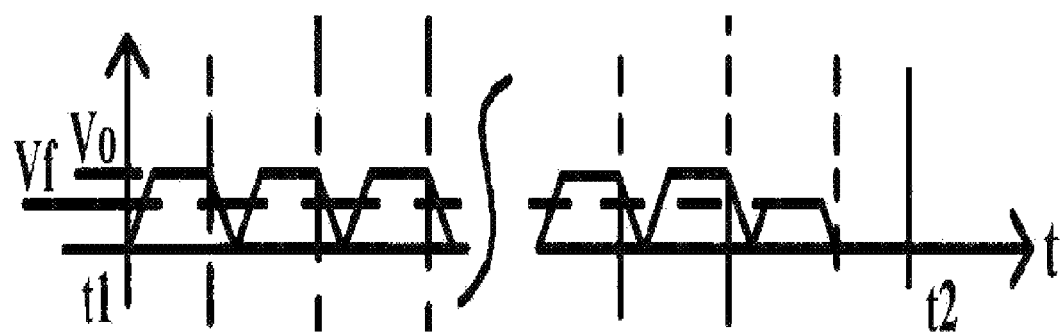
FIG. 6 shows energy waveforms at an output port of the main loop energy quantifier according to an embodiment of FIG. 5.
Figure 7:
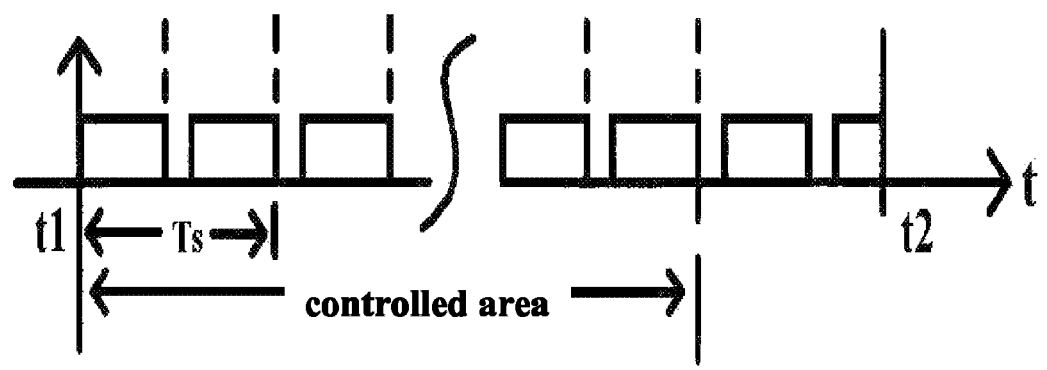
FIG. 7 shows a disable pulse of the spilt phase controller output port according to an embodiment of FIG. 6.
Figure 8:
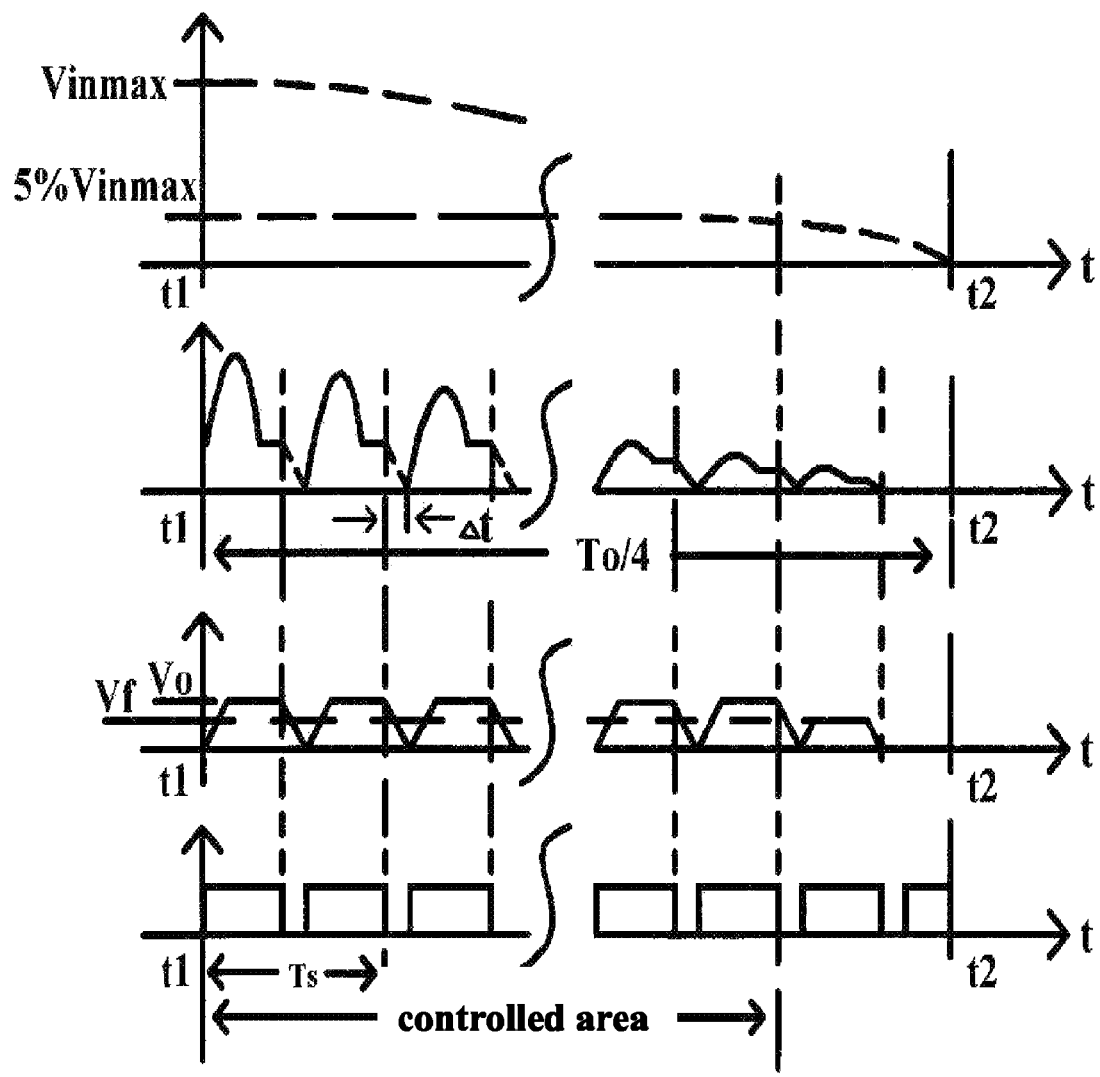
FIG. 8 shows a time sequence diagram in embodiments corresponding to FIG. 4 to FIG. 7.

Some waveforms in the embodiments are shown. A waveform of a bus power supply according an embodiment is shown in FIG. 3; a waveform of a bus power supply maxim and minimum value according an embodiment is shown in FIG. 4; a waveform of a high frequency current at a rectifier output port in the embodiment of FIG. 4 is shown in FIG. 5; an energy waveform generated by the main loop energy quantifier in the embodiment of FIG. 5 is shown in FIG. 6; a disable pulse from the split phase controller in an embodiment of FIG. 6 is shown in FIG. 7; a time sequence diagram in embodiments of FIG. 4 to FIG. 7 is shown in FIG. 8. The controlled area in the above figures is an area where a bus voltage changes from 5% Vmax to Vmax.

The invented technique of a LLC resonant converter is suitable for applications using systems such as DC voltage, three-phase industrial power supply and single phase civil power supply.

The invention claimed is:

1. A full voltage range LLC resonant converter, comprising
an LLC resonant converter circuit,
a current type main loop current sampler,
a rectifier,
a main loop energy quantifier,
an energy comparator,
a return-to-zero pulse generator,
an oscillator, and
a split phase controller;
wherein the current type main loop current sampler, the rectifier, the main loop energy quantifier, the energy comparator, the return-to-zero pulse generator, the oscillator, and the split phase controller are connected in series;
wherein current type main loop current sampler is configured to collect a main loop current signal of a main loop of the LLC resonant converter circuit, and to send the main loop current signal to the main loop energy quantifier through the rectifier;

wherein the main loop energy quantifier is configured to measure, in real time, remaining resonance energy of the LLC resonant main loop converter circuit;

wherein the energy comparator is configured to output a control signal to the return-to-zero pulse generator when a value of the remaining resonance energy is lower than a predetermined value; and wherein the return-to-zero pulse generator is configured to reset the oscillator by outputting a return-to-zero pulse to the oscillator.

2. The full voltage range LLC resonant converter according to claim 1, wherein said LLC resonant converter circuit comprises electric switches connected in series with a half-bridge output port, a resonant inductor, a resonant capacitor, and a primary winding of a transformer.

3. The full voltage range LLC resonant converter according to claim 1 or claim 2, wherein said current type main loop current sampler comprises a Hall element or a current transformer; wherein rectifier comprises a full-wave rectifier; wherein the main loop energy quantifier comprises an amplitude limiting conversion circuit; wherein the return-to-zero pulse generator comprises a kind of differential circuit.

4. The full voltage range LLC resonant converter according to claim 1 or claim 2, wherein the main loop current signal is a quasi sine wave or a quasi sine wave modulated in a line frequency; wherein the main loop energy quantifier is configured to output a measurement of the remaining resonance energy into the energy comparator.

5. A full voltage range control method comprising:

measuring a current in a main loop of a LLC resonant converter circuit;

quantifying a remaining resonance energy of the main loop from the current by passing the current through a rectifier to a main loop energy quantifier;

comparing the remaining resonance energy with a predetermined energy value;

when the remaining resonance energy is lower than the predetermined energy value, actuating one or more switches of an LLC resonant converter circuit.

6. The full voltage range control method according to claim 5, wherein actuating one or more switches comprises resetting an oscillator.

7. The full voltage range control method according to claim 5, wherein the LLC resonant converter circuit receives an input of a DC voltage or a full-wave rectified sine waveform voltage.

* * * * *